No. 681,966. Patented Sept. 3, 1901.
O. C. KNIPE.
HUB CAP FOR VEHICLES.
(Application filed Jan. 18, 1901.)
(No Model.)

WITNESSES:

INVENTOR:

UNITED STATES PATENT OFFICE.

OLIVER C. KNIPE, OF NORRISTOWN, PENNSYLVANIA.

HUB-CAP FOR VEHICLES.

SPECIFICATION forming part of Letters Patent No. 681,966, dated September 3, 1901.

Application filed January 18, 1901. Serial No. 43,744. (No model.)

*To all whom it may concern:*

Be it known that I, OLIVER C. KNIPE, a citizen of the United States, residing at Norristown, in the county of Montgomery, State of Pennsylvania, have invented certain new and useful Improvements in Hub-Caps for Vehicles, of which the following is a specification.

This invention relates to hub-caps and bands for the wheel-hubs of vehicles, the object being to produce a low-priced, effective, durable, and noiseles dust-cap to prevent the entrance of dirt and water to the front end of the hub and when desirable to provide at the same time an elastic step-band to facilitate getting in and out of the vehicle.

In carrying out the invention I provide a a cap, preferably of metal, the inside diameter of which is slightly larger than the outside diameter of the hub-band and interposed between the two an elastic material, such as rubber, over which the hub-cap is pushed. I preferably perforate the rim of the cap and provide the separating-strip of rubber with a number of spuds or projections coinciding with the perforations in the rim of the cap. The spuds project through the cap and afford a footing for any person entering or leaving the vehicle. In order to prevent the cap from jarring loose, I lock it by a spring connection to the hub. My invention therefore comprises a vehicle-hub and cap provided with an elastic lining by which it is secured to the hub-band.

It comprises, further, a hub-cap on which there are a number of elastic ribs or spuds on the outer surface.

It comprises, further, a hub-cap provided with perforations through which project elastic spuds connecting with the lining on the inside of the cap.

It comprises also other features the novelty of which will hereinafter be described, and definitely indicated in the claims.

Figure 1:
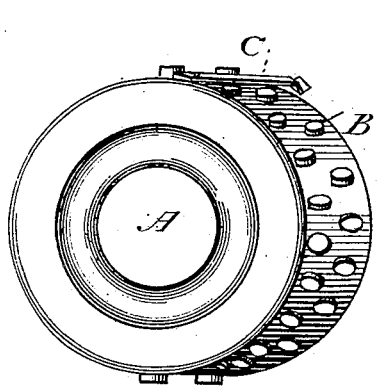
Figure 2:
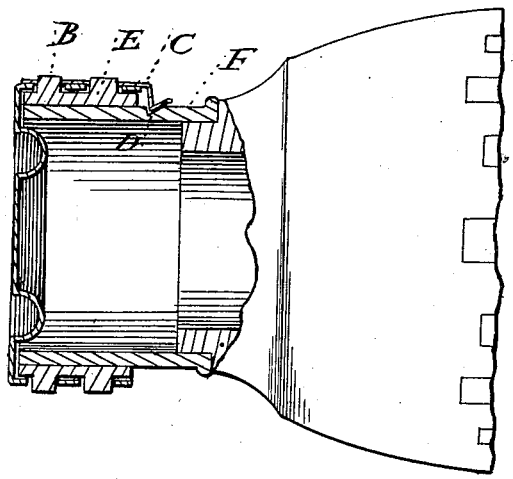

In the accompanying drawings, which illustrate the invention, Figure 1 is a perspective view of a hub-cap embodying my improvements, and Fig. 2 is a sectional elevation on a plane parallel to the axle.

The cap A is preferably formed of metal, the inside diameter of which is slightly larger than the outside diameter of the hub-band F, provided for the wheel to which it is to be applied. The strip of rubber E, preferably as wide as the depth of the cap, is formed of such thickness that when placed inside of the rim of the cap A the inside diameter of the lining when in place will be slightly smaller than the outside diameter of the hub-band. This lining material should be of an elastic nature and may with advantage be formed of rubber. Relative displacement of the lining and cap may be prevented by recesses in the hub-band, into which the elastic material may be pressed. I preferably form holes in the cap, as indicated in the drawings, and provide the rubber lining with projections on its face, such as the spuds B, which are spaced to coincide with the holes in the cap, so that the lining may be applied by pushing these spuds through the holes in the cap, and they are made of such a height that they project on the outside of the cap, thus affording a safe footing for any person stepping on the hub of the wheel to enter the vehicle.

In order to prevent displacement of the cap, I provide a spring C, fastened to the outside of its rim, the free end of the spring being adapted to drop into a notch in the hub-band, as indicated at D.

In applying the device the cap A, with its elastic lining, is pushed over the hub-band until the end of the spring enters the dent in the hub-band. The elasticity of the lining holds the cap in place on the band, the spring preventing any dislodgment from shocks or jars. The elastic lining presents marked advantages over the various metallic spring-held caps now in use, as it is entirely noiseless and much less liable to work loose.

Having thus described my invention, what I claim as new, and desire to secure by Letters Patent of the United States, is—

1. A hub-cap for a vehicle, provided with an elastic lining extending axially of the hub and held under pressure between the hub-cap and hub-band.

2. A hub-cap for a vehicle, provided with an elastic lining extending axially of the hub and held compressed between the hub-band and cap, and mechanically locked to the hub.

3. A hub-cap for a vehicle, provided with recesses and an elastic lining compressed into the recesses by the hub-band over which the cap is applied.

4. A hub-cap for a vehicle provided with peripheral holes, and an elastic lining extending through said holes, and projecting above the surface of the cap.

5. A hub-cap for a vehicle, provided with elastic projections distributed over its outer surface to form a stepping-band.

6. A hub-cap for a vehicle, provided with lugs or projections of elastic material held in cavities in the periphery of the cap.

In witness whereof I have hereunto set my hand this 16th day of January, 1901.

OLIVER C. KNIPE.

Witnesses:
WM. H. KUDER,
JAS. A. BICKEL.